United States Patent
Schulze

[11] Patent Number: 6,019,119
[45] Date of Patent: Feb. 1, 2000

[54] THERMAL SAFETY DEVICE FOR AUTOMATICALLY BLOCKING PIPES

[75] Inventor: Klaus Schulze, Gernrode, Germany

[73] Assignee: Mertik Maxitrol GmbH & Co., KG, Thale, Germany

[21] Appl. No.: 09/142,430

[22] PCT Filed: Feb. 24, 1997

[86] PCT No.: PCT/EP97/00880

§ 371 Date: Sep. 2, 1998

§ 102(e) Date: Sep. 2, 1998

[87] PCT Pub. No.: WO97/33111

PCT Pub. Date: Sep. 12, 1997

[30] Foreign Application Priority Data

Mar. 4, 1996 [DE] Germany .......................... 196 08 165

[51] Int. Cl.[7] .................................................. F16K 17/38
[52] U.S. Cl. .............................................. 137/75; 137/79
[58] Field of Search ........................ 137/72, 74, 75, 137/79

[56] References Cited

U.S. PATENT DOCUMENTS

| | | | |
|---|---|---|---|
| 997,147 | 7/1911 | McDonald et al. ...................... | 137/75 |
| 1,243,998 | 10/1917 | Smyly ....................................... | 137/75 |
| 1,332,283 | 3/1920 | Bancroft ................................... | 137/75 |
| 1,938,967 | 12/1933 | Lovekin ................................... | 137/75 |
| 2,630,822 | 3/1953 | Davies . | |
| 2,707,965 | 5/1955 | Allen . | |
| 3,366,138 | 1/1968 | Graham . | |
| 3,659,624 | 5/1972 | Kelly et al. . | |
| 3,720,220 | 3/1973 | McMath . | |
| 3,802,510 | 4/1974 | Johnson . | |
| 3,842,853 | 10/1974 | Kelly et al. . | |
| 4,263,839 | 4/1981 | Akkerman et al. . | |
| 4,442,756 | 4/1984 | Goans . | |
| 4,488,566 | 12/1984 | Hicks . | |
| 4,890,635 | 1/1990 | Gray, Jr. . | |
| 5,004,003 | 4/1991 | Gray, Jr. . | |
| 5,275,194 | 1/1994 | Gray, Jr. . | |
| 5,477,877 | 12/1995 | Schulze et al. . | |
| 5,743,285 | 4/1998 | Shalkevich ............................... | 137/74 |
| 5,836,338 | 11/1998 | Schulze .................................... | 137/75 |

FOREIGN PATENT DOCUMENTS

| | | |
|---|---|---|
| 0 118 152 | 9/1984 | European Pat. Off. . |
| 0 257 484 | 3/1988 | European Pat. Off. . |
| 0 343 615 B1 | 11/1989 | European Pat. Off. . |
| 0 364 906 A2 | 4/1990 | European Pat. Off. . |
| PS 605551 | 4/1993 | European Pat. Off. . |
| 0 574 677 A1 | 12/1993 | European Pat. Off. . |
| 1019879 | 4/1958 | Germany . |
| 1429056 | 3/1969 | Germany . |
| Gm 77 37 537 | 11/1978 | Germany . |
| 31 26 213 C2 | 1/1983 | Germany . |
| 33 44 704 A1 | 6/1985 | Germany . |
| 39 16 100 A1 | 11/1990 | Germany . |
| 90 17 534 U | 5/1991 | Germany . |
| 536051 | 5/1941 | United Kingdom . |
| 549406 | 11/1942 | United Kingdom . |
| WO 93/06397 | 4/1993 | WIPO . |

*Primary Examiner*—John Rivell
*Attorney, Agent, or Firm*—Harness, Dickey & Pierce, P.L.C.

[57] ABSTRACT

A thermal safety device is disclosed which, in the area of the closing element, has an uninterrupted circular cross section. Furthermore, the axial guiding of the closing element during the closing stroke is ensured. In the axial continuation of a seat located within the casing there is a guide pin. A closing spring is aligned on this guide pin, and, when taut, the spring is situated as far as possible inside a blind hole, with a throat acting as a control edge, inside the closing element. Under the influence of the closing spring, a ram forming a part of a detecting element, keeps the control edge adjacent to a clip-stop edge when the safety device is in the open position. Once the thermal solder element melts away, however, the resulting change in position of the ram allows the control edge to move away from the click-stop edge, so that the closing element, under the influence of the closing spring, moves into a closed position. The thermal safety device acts to shut off pipes, especially gas pipes, automatically should an inadmissible rise in temperature occur.

15 Claims, 2 Drawing Sheets

THERMAL SAFETY DEVICE FOR AUTOMATICALLY BLOCKING PIPES

BACKGROUND AND SUMMARY OF THE INVENTION

The invention concerns a thermal safety device for automatically blocking pipes, especially gas pipes, if an inadmissible rise in temperature should occur, in accordance with the characterizing clause of the first patent claim.

Such thermal safety devices, installed in pipes, for example in front of gas fittings, gas appliances, gas meters, etc., are available in a variety of designs. Their function is to interrupt the gas supply when there is a rise in temperature before the temperature on the appliances mentioned increases to such an extent that their external sealing is endangered.

In DE-OS 44 22 241, for instance, a thermal valve safety device is described of the type mentioned at the beginning. With this solution there is a closing element in the axial continuation of a seat located within the casing. This closing element is kept in the open position by at least one molding bent approximately into a U-shape. Following a sealing area facing towards the seat, on the side facing away from the seat the closing element forms a throat, to which a preferably cylindrical collar is attached. Both the legs of the molding are therefore located within the area of the throat and thus form a rest for the collar against the force of the closing spring. Furthermore, the part of the molding which links both the legs is propped on a thermal solder element, which is itself adjacent to the internal wall of the casing. Once the thermal solder element has melted away, the legs of the molding, because the molding has consequently changed its position in the casing, are no longer within the throat of the closing element. Under the influence of the closing spring the closing element thus moves to the closed position. Thereby each of the legs forms a guideway directed towards the seat for the collar and/or the sealing area of the closing element.

This solution has the drawback that the casing next to the closing element has many fittings, particularly in the circulation cross section of the closing element. In order to achieve standard specifications or the flow values desired in practice, for example, one is forced to determine the dimensions accordingly, and, as a result, similarly required and/or desired minimal dimensions, especially for installation, cannot be fulfilled.

Furthermore, in EP-PS 605 551 there is a so-called fire-protection valve with a closing spring for automatically shutting off pipes.

With this fire-protection valve a metallic closing element is aligned in a casing. In the sealing area the closing element has a spherical form, with which, under the force of a closing spring, it rests in the open position on three fixed points formed by two balls and a temperature-sensitive component. Both balls, which are themselves propped on a rest in the casing, are at such a distance from each other that they form an acceptance angle of approx. 90°. Opposite this acceptance angle the temperature-sensitive component is secured to the internal wall of the casing.

The component consists of an inwardly-open cup, the base of which is secured to the internal wall. The radially inwardly-open cup contains a solder element, into which a ball forming a clearance fit with the opening of the cup is pressed. The ball forms the third fixed point and is sized so that it is located almost entirely within the cup once the solder has melted. The three fixed points form the diameter of the rest for the metallic closing element, and its dimensions are such that, when the ball is in the cup, the closing element is pushed by the force of the closing spring through the enlarged opening resulting between the three fixed points.

FIG. 1 accompanying this device demonstrates clearly that the drawback of this solution is that the eccentrically positioned closing element is not guided axially when the closing stroke is carried out. The force direction of the closing spring is never perfectly axial because of the existing tolerances, and so in the closing stroke the ball is deflected sideways. The inevitably resulting sideways impact, and the centering movement into the seat which is therefore necessary, consume part of the kinetic energy required to achieve a force fit. Yet this force fit is needed if the thermal valve safety device is still to be effective at temperatures where the closing spring becomes powerless.

A similar solution is described in EP-OS 574 677. With this safety gas outlet, a retaining ring is positioned within the casing, either in or on a rotationally symmetric closing component, the largest external diameter of which is only slightly larger than the internal diameter of the retaining ring. Here the closing component is pressed by a spring component against the retaining ring in the direction of a sealing seat. The retaining ring consists of a material that softens at is a pre-selected, determined temperature to such an extent that the closing component is pushed by the spring component through the retaining ring and, in conjunction with a seat, shuts off the gas flow.

Although with this solution an axial bearing in the open position is achieved, because there is no axial guiding of the ball during the closing stroke there is nothing to prevent the possibility of a sideways deflection of the closing element with the drawback already mentioned in the solution described above.

DE-GM 90 17 534 is another thermal safety device with the same drawback. Here a pre-stressed closing cone with a retaining bolt against a compression spring is aligned in the casing. Whereas the retaining bolt is fixed to the closing cone with its first end, with its second end, the diameter of which is enlarged, it is propped on a pyrometric element, through the central opening of which the retaining bolt juts.

A structurally similar device for shutting off pipes, as described in DE-OS 39 16 100, attempts to counter this drawback by having the retaining bolt held centrally by means of a separate guiding element. The disadvantage with this is that as well as the extra component, high manufacturing costs are involved. In order to assure sufficient guiding the overall dimensions are also increased.

The problem forming the basis of the invention is the development of a thermal safety device of the type mentioned, which has an uninterrupted circular cross section in the area of the closing element. Furthermore, the closing element should be guided axially during the closing stroke. The production costs and the overall dimensions should thus be kept as low and as small respectively as possible.

In accordance with the present invention the problem is solved as follows. In the axial continuation of a seat located within the casing there is a guide pin. On this guide pin a closing spring is aligned, which when taut is located as far as possible inside a blind hole drilled in the closing element. The blind hole has a throat which serves as a control edge. A ram, as part of a detecting element, is on the one side propped on a thermal solder adjacent to the internal wall of the casing, and on the other side on the external surface of the closing element in the area of the control edge, so that the area of the control edge is located off-center. When the safety device is in the open position the ram, under the influence of the closing spring, keeps the control edge adjacent to a click-stop edge.

Once the thermal solder melts away, on the other hand, the control edge is no longer adjacent to the click-stop edge because of the resulting change in position of the ram. Consequently, under the influence of the closing spring, the closing element takes up the closed position. The guide pin then forms a guideway directed towards the seat for the closing spring, and this in turn serves as a guide for movement of the closing element.

A solution has thus been found removing the disadvantage of the background art that the casing has many fittings next to the closing element, particularly in the circulation cross section of the closing element. What particularly makes this solution stand out is its simplicity.

In order to develop the optimum circulation cross section it is especially advantageous if the throat which serves as the control edge is aligned in the blind hole on the end of the closing element facing away from the seat, and furthermore if the external diameter of the closing element in the area of the control edge is substantially smaller than the diameter of the seat.

Other beneficial developments of the invention are indicated in the other patent claims. One particular advantage is if the guide pin is formed by a metal molding, the surfaces of which run parallel to the casing axis lying in the flow direction, and therefore also parallel to the internal wall of the casing. Then only a minimum of flow resistance will be generated by the metal molding. On the end facing away from the closing element the metal molding is connected to the casing, preferably through compression, by means of a widening on both sides, whereby the necessary double-sided widening forms a bearing shoulder for the closing spring at the same time. It is also possible to integrate the click-stop edge into the metal molding.

A particularly good solution is achieved if the click-stop edge is formed by the end of the closing spring facing away from the seat. In addition the guide pin has at least one recess for the end of the closing spring facing away from the seat to click on to.

For reasons of assembly in particular it is also beneficial if the casing has two guide grooves opposite one another to accommodate the widened parts of the metal molding, preferably under the conditions of a force fit.

For reasons of flow as well as assembly it is good if the ram is propped parallel to its longitudinal axis on one side on the widening of the metal molding.

DESCRIPTION OF THE PREFERRED EMBODIMENT

Figure 1:
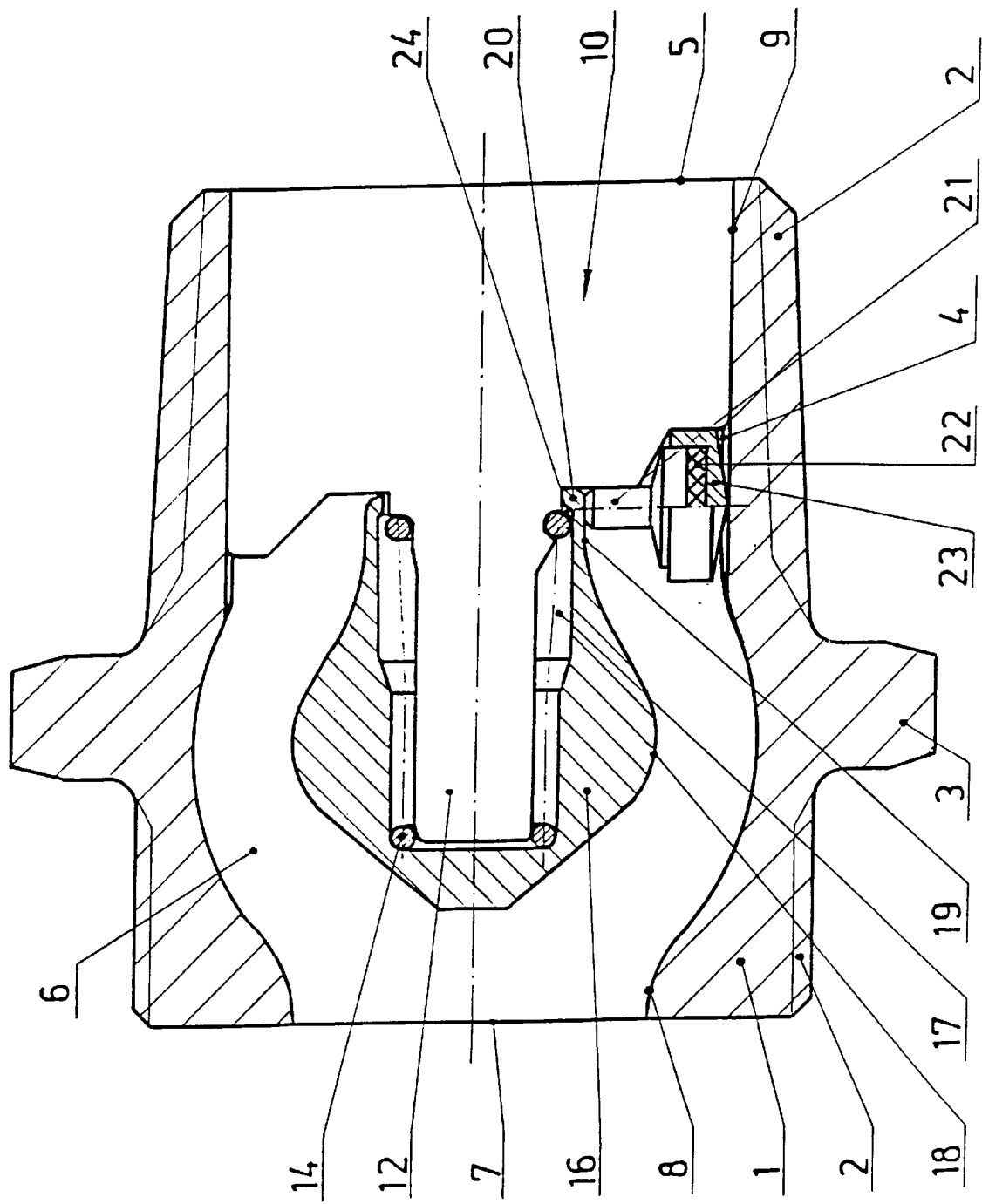
FIG. 1 shows a cross section of the thermal safety device in the open position, all in accordance with the present invention.

The thermal safety device in accordance with the present invention described hereafter, and represented in FIG. 1, has a tubular casing (1) with a connection at each of the two ends, each represented in this case by an external screw thread (2). Another form of connection is also of course possible. Between the two connecting threads (2) the casing (1) has an external hexagonal shaped flange (3), which will accommodate a wrench or similar tool when the device is installed into a gas pipe, the latter not being represented on the diagram.

In the continuation of the inlet (5) a tubular area (4) is connected in the casing (1), which for reasons of flow passes into an extension (6). Here the contour of the extension (6) is adapted to the contour of a closing element (16), described below in more detail, in order to achieve optimum flow. Connected to the extension (6) is the area of the seat (8), aligned in front of the outlet (7). In proximity to the tubular area (4) there are two guide grooves (9) opposite each other to accommodate the widened parts (11) of a metal molding (10), which are pressed into the guide grooves (9). It has proved to be advantageous to give the widened parts (11) a slight lead-in incline in order to facilitate installation.

Figure 2:
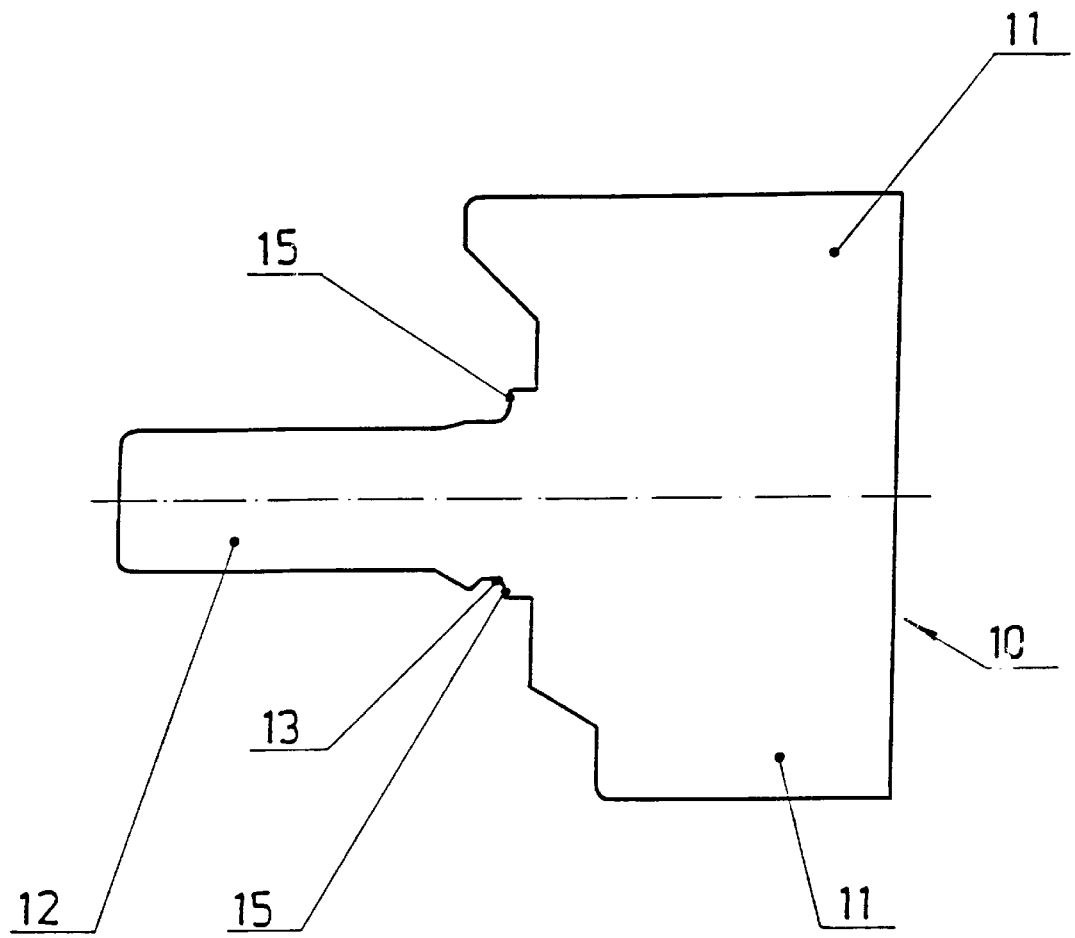
FIG. 2 is a view showing a separate diagram of a possible design for the metal molding which may be utilized in the device of FIG. 1.

The metal molding (10), with its centrally aligned guide pin (12), juts into the extension (6) of the casing (1). As can be seen in FIG. 2, the guide pin (12) has on the end facing towards the widened parts (11) a recess (13) on one side. This serves to enable one end of a compression spring, which functions as a closing spring (14), to click on. The function of this as a click-stop edge (24) is described in more detail below, whereby the spring end is otherwise propped on a bearing shoulder (15) located on each of the widened parts (11).

In the area of the extension (6) of the casing (1) there is a closing element (18), with a spherical sealing area (16) in this embodiment, which tapers in an approximately conical form towards the outlet (7), also for reasons of flow. Towards the inlet (5) the spherical sealing area (18) passes into a neck-shaped area (19), the external diameter of which is substantially smaller than the diameter of the seat (8). In the front facing towards the inlet (5) the closing element (16) has a blind hole (17), which accommodates the closing spring to the largest possible extent when it is taut, i.e. in the open position, and in the base of which the closing spring, guided by the guide pin (12), is propped. In the immediate vicinity of the front the blind hole (17) has a circumferential throat, whose function as a control edge (20) is described in more detail below.

On the external surface of the neck-shaped area (19), in the area of the control edge (20), which is located in the zone of contact of the click-stop edge (24), the front of a ram (21) of a detecting element is propped, which with its other end rests on a thermal solder element (22). The thermal solder element (22) is conveniently reposited in a cup (23), propped on the interior wall of the casing (1) and thereby partially jutting into a guide groove (9). The overall length of the detecting element is measured so that by means of the ram (21) the closing element (16) in the area of the control edge (20) is located so far off-center that the control edge (20), under the force of the closing spring (14), is propped on the spring end, which is clicked into position in the recess (13) and serves as a click-stop edge (24).

The action of the thermal safety device in accordance with the present invention is as follows:

Should an inadmissible rise in temperature occur, the thermal solder element (22) will melt. Consequently, the ram (21) will, under the force of the closing spring (14), be pushed into the cup (23). As a result of this change in position of the ram (21), the control edge (20) will slide away from the click-stop edge (24) and, by the force of the closing spring (14), the closing element (16) will be pushed with its spherical sealing area (18) into the seat area (8).

During the closing stroke the closing element (16) will, by the closing spring (14), and this in turn by the guide pin(12), be guided in an axial direction, thus avoiding any radial deflections of the closing element (16) and the resultant negative effects on the sealing action.

The thermal safety device in accordance with the present invention is of course not simply confined to the embodiment represented here. Changes and modifications are possible without departing from the parameters of the invention. For instance, the connections with external screw threads can also have internal threads or a flange. Furthermore, the spherical sealing area (18) can also be designed as a cone, for example. In addition, it is also possible to integrate the click-stop edge (24) into the metal molding (10).

I claim:

1. A thermal safety device for automatically blocking pipes, especially gas pipes in the event of an excessive increase in temperature comprising:
    a casing having a passage extending therethrough and a seat adjacent one end thereof;
    a metallic closing element disposed within said passage, and movable from an open position to a closed position in which said closing element engages said seat, said closing element including a hole opening outwardly from one end thereof and a control edge adjacent said hole opening;
    a guide pin supported within said passage in said casing;
    a spring supported on said guide pin and extending into said hole, said spring being operative to bias said closing element into said closed position, one end of said spring defining a click stop edge;
    a detecting element including a ram supported on a thermal solder element, said detecting element being supported within said passage in said casing, said ram being engageable with said closing element to urge said control edge into engagement with said click stop edge to thereby retain said closing element in said open position, said ram being movable to allow movement of said control edge out of engagement with said clock stop edge in response to melting of said solder element whereby said guide pin operates to guide movement of said closing element into said closed position.

2. A thermal safety device for automatically blocking pipes according to claim 1 wherein said closing element includes a throat at said one end, said control edge being provided on said throat and said one end of said closing element (16) faces away from said seat (8), and the external diameter of the closing element (16) in the area of the control edge (20) is substantially smaller than the diameter of the seat (8).

3. A thermal safety device for automatically blocking pipes according to claim 1 wherein said guide pin (12) is formed by a metal molding (10), which, at the end facing away from the closing element (16), is connected to said casing by means of widening portion (11) on both sides thereof, said widened portions being press fitted into said passage of said casing (1) and said widening portions form a bearing shoulder (15) for said spring (14).

4. A thermal safety device for automatically blocking pipes according to claim 3 wherein said metal molding (10) defines in part a click-stop edge (24).

5. A thermal safety device for automatically blocking pipes according to claim 1 wherein said clock-stop edge (24) is formed by the end of the closing spring (14) facing away from the seat (8) and said guide pin (12) has at least one recess (13) for the end of the closing spring (14) facing away from the seat (8) to click on to.

6. A thermal safety device for automatically blocking pipes according to claim 3 wherein said casing (1) has two guide grooves (9) opposite each other for the accommodation of said widening portions (11) of the metal molding (10) under the conditions of a force fit.

7. A thermal safety device for automatically blocking pipes according to claim 6 wherein said ram (21) is propped on one side of the widened part ()11) of the metal molding (10) adjacent said recess (13).

8. A thermal safety device for automatically blocking pipes according to claim 2 wherein said guide pin (12) is formed by a metal molding (10), which, at the end facing away from the closing element (16), is connected to said casing by means of widening portion (11) on both sides thereof, said widened portions being press fitted into said passage of said casing (1) and said widening portions form a bearing shoulder (15) for said spring (14).

9. A thermal safety device for automatically blocking pipes according to claim 2 wherein said clock-stop edge (24) is formed by the end of the closing spring (14) facing away from the seat (8) and said guide pin (12) has at least one recess (13) for the end of the closing spring (14) facing away from the seat (8) to click on to.

10. A thermal safety device for automatically blocking pipes according to claim 3 wherein said clock-stop edge (24) is formed by the end of the closing spring (14) facing away from the seat (8) and said guide pin (12) has at least one recess (13) for the end of the closing spring (14) facing away from the seat (8) to click on to.

11. A thermal safety device for automatically blocking pipes according to claim 4 wherein said casing (1) has two guide grooves (9) opposite each other for the accommodation of said widening portions (11) of the metal molding (10) under the conditions of a force fit.

12. A thermal safety device for automatically blocking pipes according to claim 5 wherein said casing (1) has two guide grooves (9) opposite each other for the accommodation of said widening portions (11) of the metal molding (10) under the conditions of a force fit.

13. A thermal safety device for automatically blocking pipes according to claim 8 wherein said casing (1) has two guide grooves (9) opposite each other for the accommodation of said widening portions (11) of the metal molding (10) under the conditions of a force fit.

14. A thermal safety device for automatically blocking pipes according to claim 9 wherein said casing (1) has two guide grooves (9) opposite each other for the accommodation of said widening portions (11) of the metal molding (10) under the conditions of a force fit.

15. A thermal safety device for automatically blocking pipes according to claim 10 wherein said casing (1) has two guide grooves (9) opposite each other for the accommodation of said widening portions (11) of the metal molding (10) under the conditions of a force fit.

* * * * *

UNITED STATES PATENT AND TRADEMARK OFFICE
CERTIFICATE OF CORRECTION

PATENT NO. : 6,019,119
DATED : February 1, 2000
INVENTOR(S) : Klaus Schulze

It is certified that error appears in the above-identified patent and that said Letters Patent is hereby corrected as shown below:

Title page, item [57],
Abstract, line 11, "clip-stop" should be --click-stop--.

Column 2, line 26, delete "is".

Column 4, line 29, "(18)" should be --(16)--.

Column 4, line 29, "(16)" should be --(18)--.

Column 5, line 49, claim 1, "clock" should be --click--.

Column 6, line 2, claim 5, "clock-stop" should be --click-stop--.

Column 6, line 14, claim 7, "()" should be --(--.

Column 6, line 25, claim 9, "clock-stop" should be --click-stop--.

Signed and Sealed this

Sixteenth Day of January, 2001

Attest:

Q. TODD DICKINSON

*Attesting Officer*  *Commissioner of Patents and Trademarks*